United States Patent [19]

Ohtaki et al.

[11] 3,964,075
[45] June 15, 1976

[54] PHOTOGRAPHING APPARATUS

[75] Inventors: Syohei Ohtaki, Machida; Mithutoshi Ogiso, Kawasaki; Takehiko Kiyohara, Zama; Taizo Mitani, Yokohama, all of Japan

[73] Assignee: Canon Kabushiki Kaisha, Tokyo, Japan

[22] Filed: Oct. 29, 1974

[21] Appl. No.: 518,984

Related U.S. Application Data

[63] Continuation of Ser. No. 291,211, Sept. 22, 1974, which is a continuation of Ser. No. 31,491, April 24, 1970.

[30] Foreign Application Priority Data

Apr. 30, 1969  Japan................................ 44-33961
Apr. 2, 1970   Japan................................ 45-28122
Apr. 7, 1970   Japan................................ 45-29219

[52] U.S. Cl................................. 354/51; 354/23 R; 354/50; 354/60 R; 354/235; 354/238
[51] Int. Cl.²........................ G03B 9/58; G03B 7/08; G03B 19/12
[58] Field of Search.............. 354/23, 50, 51, 60 R, 354/238, 234, 235

[56] References Cited

UNITED STATES PATENTS

| | | | |
|---|---|---|---|
| 3,187,653 | 6/1965 | Rentschler | 354/238 |
| 3,548,732 | 12/1970 | Rentschler | 354/238 |
| 3,561,342 | 2/1971 | Starp | 354/51 |
| 3,728,952 | 4/1973 | Kiyohara | 354/238 |
| 3,733,984 | 5/1973 | Yata | 354/51 |

*Primary Examiner*—L. T. Hix
*Assistant Examiner*—Russell E. Adams, Jr.
*Attorney, Agent, or Firm*—Toren, McGeady and Stanger

[57] ABSTRACT

In the photographic apparatus disclosed a long-exposure adapter is attached to a camera to lengthen the camera's shutter operating times. When the camera's light sensing system responds to a low illumination by setting the shutter time to B (infinite time), an operator shifts to the long exposure range. The adapter then responds to a high sensitivity sensor and a long exposure timing device in the adapter is adjusted for the low illumination. The adapter then operates the shutter release of the camera, which has been set to B to obtain long exposures.

22 Claims, 10 Drawing Figures

INVENTOR
SYOHEI OHTAKI
MITHUTOSHI OGISO
TAKEHIKO KIYOHARA
TAIZO MITANI

PHOTOGRAPHING APPARATUS

This is a Continuation of application Ser. No. 291,211 filed Sept. 22, 1972, which, in turn, was a continuation of application Ser. No. 31,491 filed Apr. 24, 1970.

The present invention relates to a photographic apparatus, especially to a photographic apparatus for photographing poorly illuminated objects or objects with low brilliance.

Figure 1:
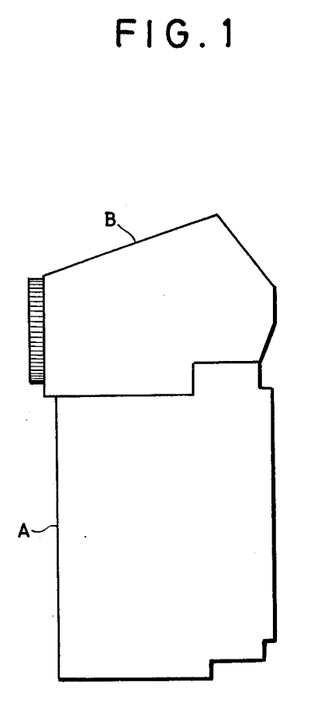
FIG. 1 is a side elevation of an apparatus in which an adapter B for sensing objects with a high brilliance is attached to a camera body A.
Figure 2:
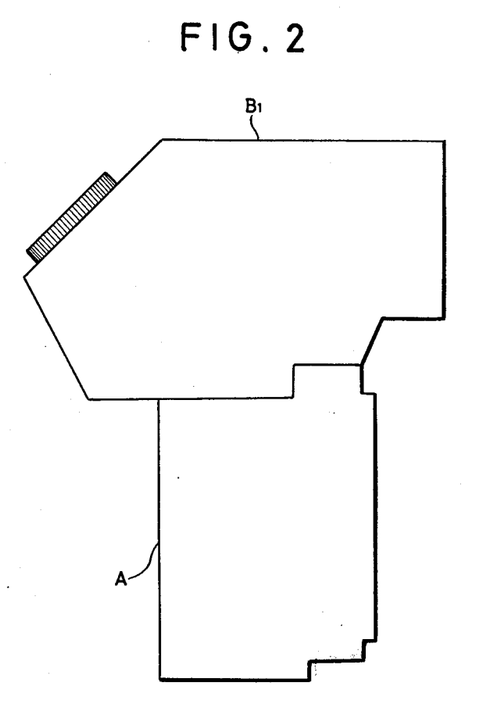
FIG. 2 is a side elevation of an apparatus in which an adapter $B_1$ for sensing objects with a low brilliance is attached to a camera body A.

Now, an example of the present invention is explained in detail by referring to drawings in which:

FIG. 1 shows a case in which a single lens reflex camera comprises a camera body A, an adapter B which is simply attachable to and detachable from the camera body A. FIG. 2 shows a case in which a single lens reflex camera comprises an adapter $B_1$ mounted to and dismounted from the main body A of camera.

Figure 3:
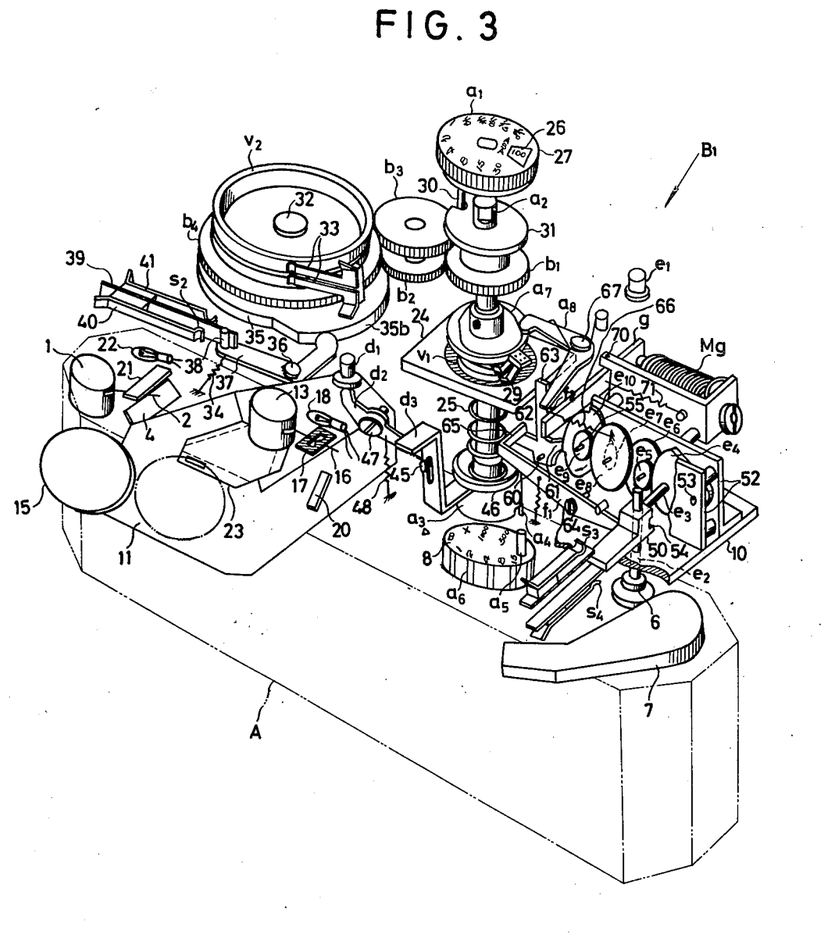
FIG. 3 is a slant view of an apparatus of the present invention showing an adapter in a broken-up way as viewed from its rear.
Figure 5:
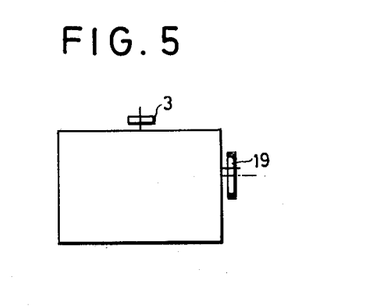
FIG. 5 is a schematic view of the field of vision of a finder in case of the apparatus shown in FIG. 3.

As shown in details in FIG. 3, the camera body A has an ammeter 1 for a high illumination exposure meter to detect the light from an object with a high brilliance, and a reflective mirror 4 which projects the image 19 of a pointer 2 of the meter 1 within the field of vision of a finder as shown in FIG. 5. A shutter dial $a_6$; a shutter release button 6, and a film wind-up lever 7 are provided above the camera body A. At the upper surface of the dial $a_6$, are shown graduations such as 1000, 500 .... corresponding to the shutter speed and ∞ indicating that the shutter has been released.

The adapter B is for photographing objects with a high brilliance and has in its optical system for a finder, a shutter graduation indication device, etc.

The adapter $B_1$ is for photographing objects with a low brilliance, and one of its constructions will be explained in details referring to FIG. 3.

Figure 4:
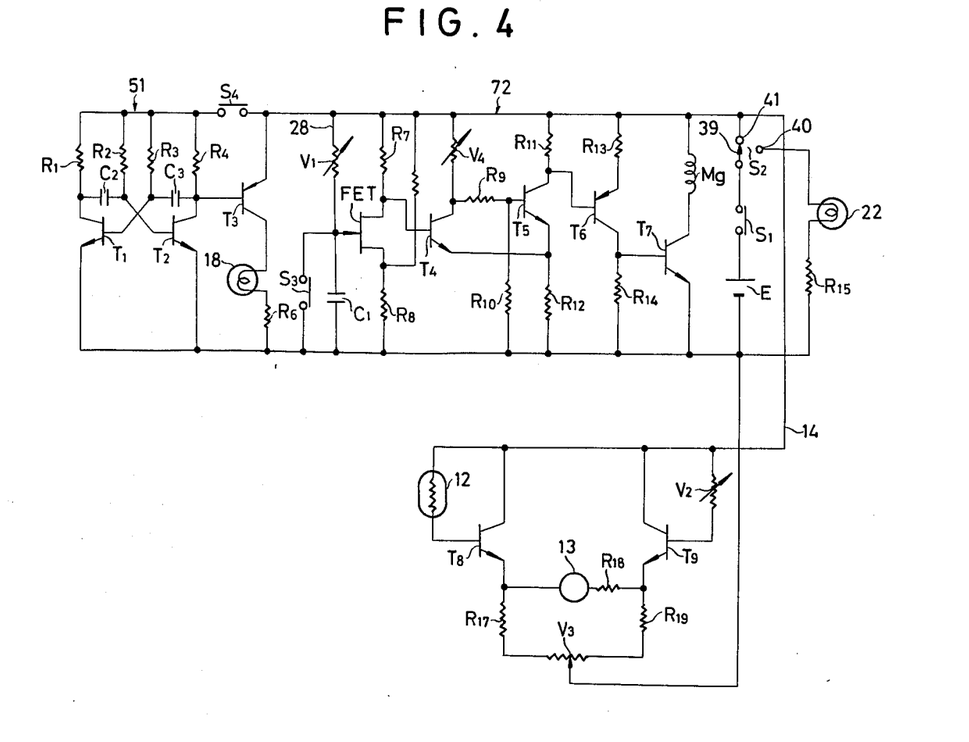
FIG. 4 is an electrical circuit diagram suitable for the apparatus shown in FIG. 3.

A prism 11 of the optical system is fixed on a frame 10 of the adapter $B_1$. A light sensing element 12 to receive the light from objects with such low brilliance as EV-3 and an ammeter 13 of a low illumination exposure meter are provided near the optical system. The light sensing element 12 and the meter 13 are connected to a light measure circuit 14 as shown in FIG. 4.

Reference numeral 15 denotes an eye-piece of the optical system. A mask 17 and a lamp 18 are provided above a pointer 16 of the meter 13, and below the pointer 16 a reflective mirror 20 to project the image 3 of the pointer 16 within the field of vision of the finder as shown in FIG. 5. A diffusion plate 21 and a lamp 22 are located above the pointer 2 of the meter 1 and are provided at the adapter $B_1$. A guide prism 23 projects the image of the pointer 16 and the mask 17 into the finder.

A support plate 24 fixed to the frame 10 of the adapter $B_1$ rotatably holds an axle $a_2$ which extends vertically. A shutter dial $a_1$ for the adapter is attached to the upper end of axle $a_2$. A connecting tube $a_3$ is fixed to the lower end of the axle in such a manner that the tube $a_3$ can move up and down, but transmits a rotating force to the shutter dial $a_6$. The tube $a_3$ is elastically biased downward by a spring 25 and a groove $a_4$ is provided at the lower part of the tube $a_3$ so that the groove $a_4$ engages a pin $a_5$ projecting upwardly from the upper surface of the dial $a_6$.

The upper surface of the dial $a_1$ exhibits graduations such as 1/60, 1/30, ... 1/2, 1, 2, 4 .... 30 corresponding to exposure times of the shutter. A film sensitivity (ASA) indicator plate 26 is provided inside, the dial $a_1$, and the set graduation on this plate 26 shows through an aperture 27 of the dial $a_1$.

A brush 29 fixed to the axle $a_2$ contacts slidably with a variable resistor $V_1$ for time setting, and the variable resistor $V_1$ is connected in series to a capacitor $c_1$ in a timer circuit 28 as shown in FIG. 4.

The film sensitivity indicator plate 26 is connected through a pin 30 to an adder tube 31 rotatably supported around the axle $a_2$. A gear $b_1$ fixed on the tube 31 actuates a gear $b_4$ supported rotatably around an axle 32 through intermediate gears $b_2$ and $b_3$.

A variable resistor $V_2$ for sensing exposure time is fixed to the gear $b_4$. A variable resistor $V_2$ is slidably connected symmetrically to the sensing element 12 to the light measuring circuit 14 as shown in FIG. 4. Reference numeral 33 denotes a brush for $a_3$, resistor $V_2$.

A cam 35 is fixed to the gear $b_4$, and one end of a lever 37 rotatably fixed about an axle 36 engages with the cam 35, while a pin 38 projecting from the other end of the lever 37 engages a contact arm 39 of a change-over switch $S_2$. 34 is a spring to elastically bias the lever 37 so that the latter rotates in a counter clockwise direction.

The contact arm 39 connects with a contact 40 when the time of an ordinary high brilliance photographing, that is, when the shutter speed is faster than, for example, 2 seconds. It is connected to a contact 41 during low brilliance photography, that is, when the shutter is opened for an exposure time longer than 2 seconds.

As shown in FIG. 4, the lamp 22 is connected to the contact 40. The contact 41 is connected to circuits for low brilliance photography such as an indicator circuit 51 for the lamp 18, the light measuring circuit 14, the timer circuit 28, etc.

A bent plate $d_3$ is so guided around a pin 45 mounted on the frame 10 that the plate $d_3$ moves up and down, and one end of this plate $d_3$ faces underside of a flange 46 of the connecting tube $a_3$, 3, while the other end of this plate $d_3$ faces one end of a lever $d_2$ which is rotatably supported on an axle 47. A push button $d_1$ is provided above the top of other end of the lever $d_2$ to press the latter downwardly. The lever $d_2$ is elastically biased by a spring 48 so that it tends to rotate in a clockwise direction.

A push rod $e_2$ is supported to slide through the frame 10 so that the rod moves up and down. The lower end of the push rod $e_2$ faces the release button 6 and a push button $e_1$ is fixed to the upper end of the push rod $e_2$.

An arm 50 is attached fixedly to the push rod $e_2$, and a switch $S_3$ is connected when the arm 50 is at its upper position, and a switch $S_4$ is connected when the arm 50 is at its lower position.

As shown in FIG. 4 the switch $S_3$ is connected in parallel with the above capacitor $C_1$, and the indicator circuit 51 is connected through the switch $S_4$ to the contact 41. The indicator circuit 51 comprises a multi-vibrator circuit having transistors $T_1$, $T_2$, and resistors $R_1$, $R_2$, $R_3$, and $R_4$, and capacitors $C_2$, and $C_3$. The output of the indicator circuit 51 is supplied to the base of a transistor $T_3$ for the lamp 18.

A sector gear $e_4$ is supported through an axle 53 on a vertical plate 52 fixed to the frame 10. And a pin $e_3$ is mounted on the sector gear $e_4$ engages a laterally extending groove 54 provided at the arm 50. The sector gear $e_4$ is connected through intermediate gears $e_5$, $e_6$, $e_7$, $e_8$ and $e_9$, to an one-way pulley $e_{10}$ rotatably fixed to an axle 55.

An engaging member $f_2$, having a pawl 61 is rotatably fixed to an axle 60, and engages a stepped portion of the pulley $e_{10}$. The engaging member $f_2$ has extending arms 62, 63. A lever $f_1$ having a bent part 65 at one end for engagement with the arm 62 is rotatably fixed to an axle 64 at its central portion. The other end of the lever $f_1$ faces the above arm 50 with a proper spacing.

A spring 66 elastically biases the engaging member $f_2$ in a clockwise direction.

A cam $a_7$ is attached to the axle $a_2$. One end of a bell crank $a_8$ rotatably fixed around an axle 67 engages the cam $a_7$, while the other end of the bell crank $a_8$ engages the arm 63.

An electro-magnet Mg is fixed to the vertical plate 52. A release lever g attracted at its one end by the electro-magnet Mg is rotatably supported around an axle 70, and the other end of the lever g faces to the arm 63.

A spring 71 elastically biases the lever g so that the latter rotates in a counter-clockwise direction.

As shown in FIG. 4 the electro-magnet Mg is connected in series to a transistor $T_7$ which functions as a switching element.

One end of the capacitor $C_1$ for the timer circuit 28 is connected to a gate of a field effect transistor FET. A Schmidt circuit 72 having transistors $T_4$ and $T_5$, supplies the output of the field effect transistor FET to a base of a transistor $T_6$. The output signal then is delivered to the electro-magnet Mg through the amplifier transistor $T_7$.

In FIG. 4, E is a power source, $S_1$ is a main switch connected between the switch $S_2$ and the power source E, S suffix indicates a switch, C suffix means a capacitor, V suffix shows a variable resistance, and R suffix means a resistance.

Next, functions of the apparatus shall be explained.

When photographing objects having a low brilliance, the adapter $B_1$ is mounted in place in lieu of the adapter B. The pin $a_5$ at the camera body A engages with the groove $a_4$ of the connecting tube $a_3$. Therefore, as the dial $a_1$ is rotated the dial $a6$ follows through the axle $a_2$, the connecting tube $a_3$, the groove $a_4$, and the pin $a_5$, thus setting the shutter speed.

During this process the bell crank $a_8$ engages the arm 63, thereby preventing the rotation of the engaging member $f_2$.

When the main switch $S_1$ is closed and the sensing range for the object extends within the sensing range of the exposure meter attached to the camera body, that is when the object is bright, the lever 37 contacts the lower position of the cam 35. Therefore, the contact arm 39 of the switch $S_2$ is connected to the contact 40. This illuminates the lamp 22 for the pointer 2 of the meter 1, and the image 19 of the pointer 2 is viewed through the finder.

When the brilliance of objects to be photographed is low and falls outside of the sensing range, the dial $a_1$ is rotated in a clockwise direction. The cam 35 is rotated through the axle $a_2$, and gears $b_1$, $b_2$, $b_3$, $b_4$. Then one end of the lever 37 contacts the stepped up portion 35b of the cam 35. In this way the lever 37 is rotated in a clockwise direction, and the contact arm 39 is connected to the contact 41 through the pin 38 to cause the lamp 22 to turn off. This activates the transistor $T_3$, and the lamp 18 is illuminated while the image 3 of the pointer 16 of the meter 13 is viewed through the field of vision of the finder. On the other hand power from the battery E keeps the light measuring circuit 14 in operation.

In this circuit the sensing element 12 with a high sensitivity receives the light which passes through the photographing lens and the lens diaphragm provided in the camera body and the prism 11 of the optical system. On the other hand the dial $a_1$ is rotated to adjust the variable resistor $V_2$ through gears $b_1$, $b_2$, $b_3$, and $b_4$. Therefore when the position of the dial $a_2$ is adjusted so that the pointer 16 of the meter 13 coincides with the center of the mask 17, the shutter speed may be selected corresponding to the brilliance the object at that time.

Therefore as the push button $e_1$ is pressed at this time, the push rod $e_2$ pushes the release button 6, thus photographing with proper exposure is achieved.

When the brilliance of objects is low and the shutter speed is longer than 1 second, the dial $a_6$ reaches the graduation $\infty$ for the released state and does not rotate further. Therefore the push button $d_1$ is pressed and the connecting tube $a_3$ is raised by means of the lever $d_2$ and the plate $d_3$, thereby disconnecting the dial $a_1$ from the dial $a_6$. Therefore the dial $a_1$ rotates further and such a graduation position as 2 seconds or longer is properly brought about. On the other hand at this time, by the rotation of the cam $a_7$ the bell crank $a_8$ rotates in a counter-clockwise direction and one end of the crank $a_8$ disengaged from the arm 63 of the engaging member $f_2$. Thus the engaging member $f_2$ rotates in a direction to engage the one-way puller $e_{10}$.

As the push button $e_1$ is pressed under the condition wherein the shutter speed is set at a value of 2 seconds or longer, the push rod $e_2$ is brought down, pressing the release button 6 and placing the shutter in the released state. On the other hand, first the one-way pulley $e_{10}$ rotated in a clockwise direction by means of the groove 54 of the arm 50, a pin $e_3$, and gears $e_4$, $e_5$, $e_6$, $e_7$, $e_8$, and $e_9$, while the lever $f_1$ rotates in a clockwise direction as the arm 50 comes down further. Thus the bent part 65 of the lever 60 comes off the arm 62 and the engaging member $f_1$ is rotated in a clockwise direction by the elasticity of the spring 66. The pawl 61 then engages the one-way pulley $e_{10}$ and is locked at such a state that the push rod $e_2$ comes down to release the shutter.

On the other hand descent of the arm 50 opens the switch $S_3$ and closes the switch $S_{This\ opens\ the\ short\ circuit\ across\ the\ capacitor\ C_1}$ of the timer circuit 28. The capacitor $C_1$ is now charged through the variable resistor $V_1$, and the indicator circuit 51 is activated through the connection of the switch $S_4$ to periodically interrupt the transistor $T_3$ thus flashing the lamp 18 and informing the operator of the released state of the shutter.

Thus, as the potential across the capacitor $C_1$ reaches a certain value, the field effect transistor FET is rendered thus activating the transistor $T_7$ after amplification through the Schmidt circuit 72. This the electromagnet Mg. In this way the releasing lever g rotates in a clockwise direction and its end pushes the arm 63 in a left hand direction. The engaging member then $f_2$ rotates in a counter-clockwise direction against the elasticity of the spring 66, and the pawl 61 comes off the one-way pulley $e_{10}$. Therefore, by the elasticity of a restoring spring which is not shown in the drawing, the gears $e_7, e_8, \ldots e_4$ rotate in a reverse direction and both the push button $e_1$ and push rod $e_2$ move upward, then release button 6 comes out closing the shutter. Ascent of the arm 50, closes the switch Sand the charge accross the capacitor $C_1$ is discharged. The switch $S_4$ is opened thereby inactivating the flashing circuit 51.

In the above example, the coupling of the shutter dial of the camera body with the shutter dial of the adapter is uncoupled by the push button $d_1$. According to another embodiment of the invention this uncoupling step is omitted. A slipping mechanism, etc. causes the coupling to be automatically released. At the associated time, when the shutter speed is at such a low speed as 2 seconds or longer, its exposure time is controlled by an electronic timer. Of course it may be controlled by a mechanical timer.

Figure 6:
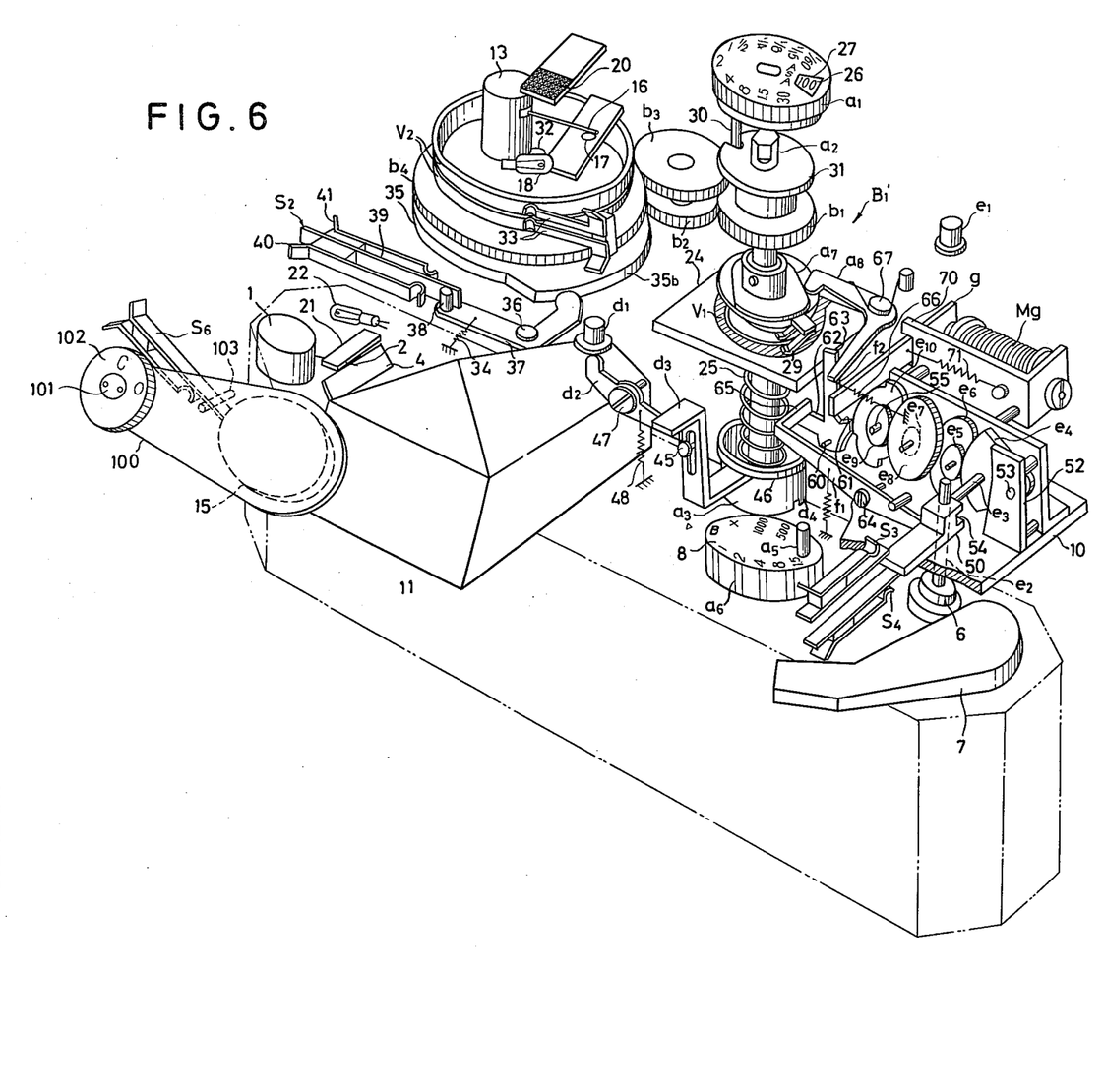
FIG. 6 is a slant view of another apparatus of the present invention showing another adapter in a broken-up way as viewed from its rear.
Figure 7:
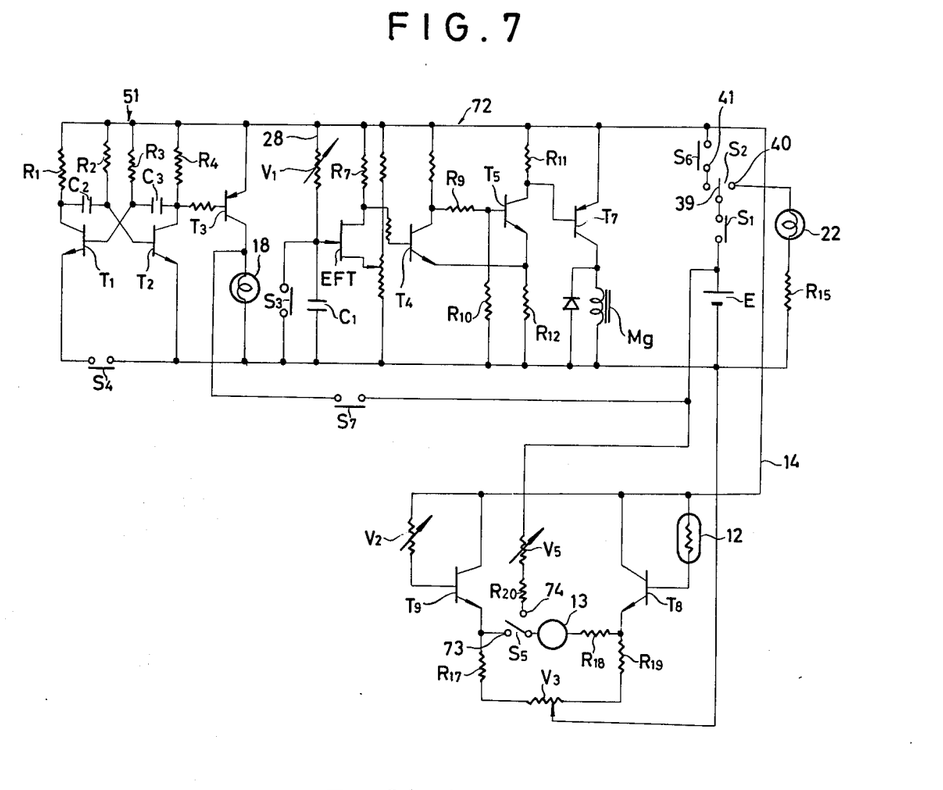
FIG. 7 is an electrical circuit suitable for the apparatus shown in FIG. 6.
Figure 8:
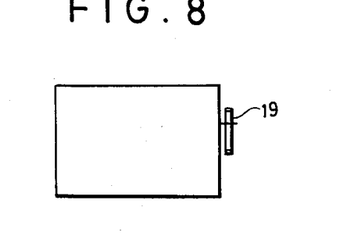
FIG. 8 is a schematic view of the field of vision a finder in case of the apparatus shown in FIG. 6.

FIGS. 6, 7 and 8 show another embodiment of the present invention useful particularly for preventing a stray light from coming into the optical system through an eyepiece of the finder at the timer of exposure measurement of photographing and for illuminating the ammeter with the lamp to let the operator recognize the working conditions of the apparatus. Members having same numerals and figures in FIGS. 6 to 8 as in FIGS. 3 to 5 represent similar members having similar functions.

In FIG. 6, an ammeter 13 and a pointer 16, a mask 17, a lamp 18, a window 20 are provided on a cup shaped disc carrying a variable resistor $V_2$. Member 100 is a shielding means, 101 is an axle fixed to the adapter $B_1'$, 102 is a knob fixed to the shielding means 100 and rotatable around the axle 101. Member 103 is a pin mounted on the shielding means 100, and $S_6$ is a switch. In this embodiment, the prism 23 in FIG. 3 is omitted.

In FIG. 7, a light measuring circuit is modified from that in FIG. 4. $S_5$ is a change-over switch, 73 and 74 are contacts, $R_{20}$ is a resistor and $V_5$ is a variable resistor. A resistor connected in series with the lamp 18 is omitted. The transistor $T_6$ and resistors $R_{13}$ and $R_{14}$ are also omitted. Switches $S_6$ and $S_7$ are additionally provided.

In FIG. 8, the image 3 disappears because the coincidence of the pointer image 3 with the mask image can be observed through the window 20 provided on the adapter $B_1'$.

In FIG. 7, the switch $S_6$ is opened whenever the shielding means does not cover the eye-piece 15. As the switch $S_6$ moves in engagement with the pin 103 planted on the shielding means 100. Thus the power supply for the low illumination exposure meter 14 is interrupted, as well as the power supply for the indicator circuit 51 for the lamp 18.

When the shielding means covers the eye-piece 15, the low illumination exposure meter is activated to effect the light measurement possible. In this way the accuracy of the light measurement is increased as the stray light through the eye-piece 15 is shielded. There is no failure to detect light coming through the lens without covering the eye-piece 15 with the shielding means 100. The ammeter 13 is also used as a checker, and the indicator lamp 18 is also used as the illuminator for the pointer 16 to inform the operator of a voltage of the battery E accurately. This is due to contacting of a change-over contact lever $S_{5c}$ with the contact $S_{5b}$ and due to opening of the switch $S_1$ in an associated manner. The switch $S_7$ works as a checker switch.

Figure 9:
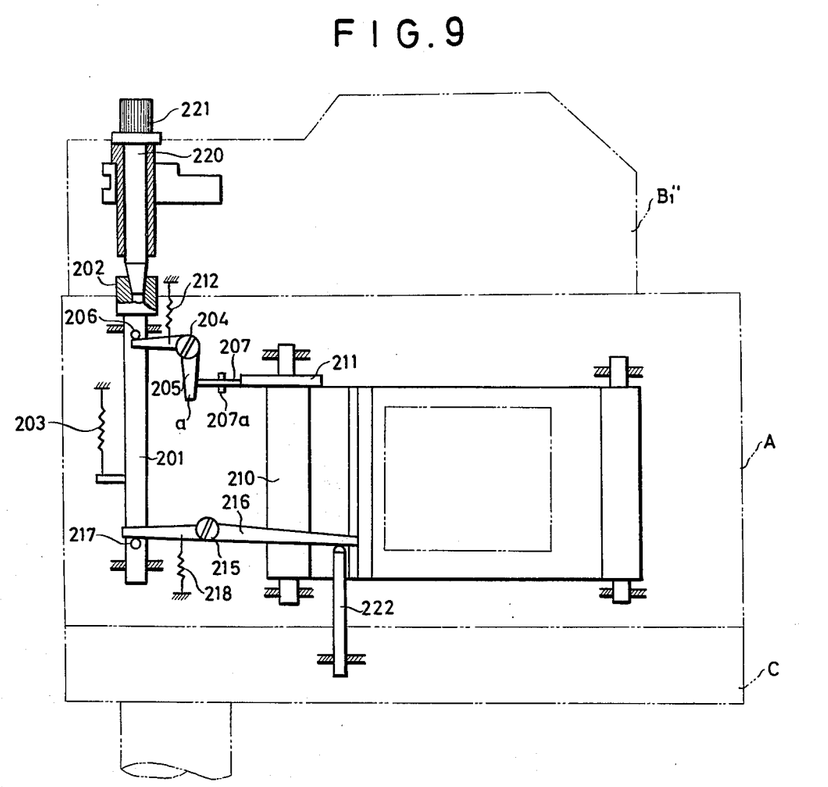
FIG. 9 is a front view of still another apparatus of the present invention showing a camera body, first and second adapters in a partially broken-up way viewed from its front.
Figure 10:
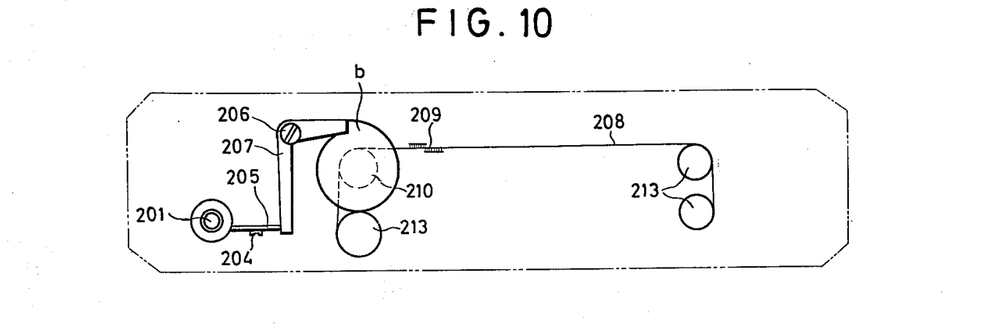
FIG. 10 is a side view the apparatus shown in FIG. 9.

FIGS. 9 and 10 show a still another embodiment in which a successive photographing with a long time exposure is effected by providing a first adapter $B_1''$ which is similar to the adapter $B_1$ and $B_1'$, and a second adapter for successive photographing.

In FIGS. 9 and 10, a release shaft 201 constituting a release mechanism is movable up and down on the upper portion of the camera body. On the shaft 201 there is a shutter button 202 which projects from the camera body. A spring 203 pulls upward the shaft 201 upwardly. A pin 206 secured on the shaft 201 engages with the upper side of one end of the bell crank 205 rotatably supported on a shaft 204. Member 212 is a spring for pulling the bell crank 205 in a clockwise direction. The other end of the bell crank 205 engages another bell crank 207 supported rotatably around the shaft 207a. The other end of the bell crank 207 engages a stepped portion b of the engaging plate 211 fixed on the shaft 210 driving a front curtain 209 of the focal plane shutter 208 as shown in FIG. 10. Member 213 is a guide roller for the focal plane shutter 208.

An interconnecting lever 216 is rotatably supported by the shaft 215 in the lower portion of the camera body A. One end of the lever 216 engages the pin 217 mounted on the shaft 201. Member 218 is a spring for pulling the lever 216 in a counter-clockwise direction. The first adapter B attachable to and detachable from the camera body A provides a low illumination exposure meter and a timer for adjusting the exposure timer. On one end of the adapter $B_1''$ there is a provided shaft 220 for the release mechanism. On the projecting end of the shaft 220 is provided a push button, and the lower end of the shaft 220 is connectable to the shutter button 202 provided on the shaft 201. A pin 222 projects through the second adapter C and is moved up and down successively by a motor. The lever 222 faces with the other end of the lever 216.

As has been explained above, photographing of objects with low brilliance can be achieved with an adapter according to the present invention. The advantages of the present invention may be summarized under.

1. Because a finder optical system having a sensing element and a low illumination exposure meter are provided at the adapter for photographing objects with low brilliance and this low illumination exposure meter senses the light of the sensing element provided in a single lens reflex camera, the exposure meter senses the exposure time corresponding to the diaphragm of photographing lens of the camera body, and the shutter speed is precisely controlled.

2. By operating the shutter dial provided at the adapter, the function of the high illumination exposure meter at the camera body and that of the low illumination exposure meter at the adapter are automatically changed in succession, thus it is convenient to handle the apparatus.

3. As the readings of the exposure meter for high illumination and for low illumination are indicated within a finder, the user easily finds out the brilliance of an object.

4. The indication of the readings of the high illumination exposure meter and of the low illumination exposure meter is automatically switched over by operating only the shutter dial. Thus is especially convenient.

5. As the lamp indicating the low illumination exposure meter flashes when the shutter is placed in a released state, the operator can detect the timing for exposure.

6. The setting of the shutter speed for high speed photographing and that of the shutter speed for low speed photographing can be achieved in succession by handling the shutter dial of the adapter. Thus it is convenient to operate. Further, because the shutter dial is set at a released position for the low speed photography and the shutter may be locked in a released state by an engaging member, a long time exposure may be reliably achieved.

7. Because engagement of the engaging member is prevented when the shutter speed is set for a high speed photographing, operation of the shutter is obstructed.

8. The engaging member locks movable part such as for accelerating and transmitting the activation of the shutter. The shutter is thus securely locked with weak force, and the release of the lock may also be achieved with week force.

What is claimed is:

1. An exposure control system for a camera, comprising shutter means, first control means for operating said shutter means over a predetermined range of shutter times, second control means for causing said first control means to operate said shutter means over a second range outside the first range, changeover means for actuating said second control means and deactivating said second control means, a camera body, said first control means and said shutter means being mounted in said camera body, an adaptor housing removably mounted on said camera body, said second control means and said changeover means being mounted on said housing, viewer means mounted in said housing for viewing the subject to be photographed, first photoelectric indicating means in said body responsive to subjects in one range of brightness and second photoelectric indicating means in said housing responsive to subjects in a second range of brightness, and optical means in said housing responsive to said second control means for displaying the response of said second indicating means in said viewer means when said changeover means actuates said second control means and for displaying the response of said first control means in said viewer means when said changeover means deactivates said second control means.

2. A system as in claim 1, wherein said first control means includes setting means for setting the shutter times within the predetermined range and wherein said second control means is coupled to said setting means and responds thereto when said setting means is in a prescribed position for setting the shutter times at a value outside the predetermined range.

3. A system as in claim 1, wherein said first control means includes actuating means for initiating operation of said first control means, the predetermined position of said setting means being such that the shutter will be maintained open as long as said actuating means are operated, and wherein said second control means is coupled to and operates said shutter means through said actuating means.

4. An exposure control system as in claim 1, wherein said second control means includes adjustment means engageable and disengageable from said first control means for adjusting the shutter times of said shutter means when engaged with said first control means and for establishing said time periods longer than the upper limit of the predetermined range when disengaged from said first control means.

5. A system as in claim 1, wherein said first control means includes setting means for setting the shutter times and the changeover means is disengageably connected with the first control means and is disengaged from said first control means when the shutter time setting is at a predetermined position.

6. A system as in claim 5, wherein said first control means includes an actuating means for initiating operation of said first control means, the predetermined position being such that the shutter is opened as long as said actuating means are opened.

7. An exposure control system for the shutter of a camera, comprising actuating means for the shutter, setting means connected to the shutter and said actuating means for setting shutter times between predetermined shutter time limits and for causing the shutter to operate at the set shutter times, said setting means also being settable to a position wherein said shutter will open and close directly in response to said actuating means, a camera body, said actuating means and said setting means being mounted in the body, an adapter housing, adjustment means in said adapter housing engageable and disengageable from said setting means for adjusting said setting means when engaged therewith and for establishing time periods longer than the predetermined limits, control means in said housing operative in response to said setting means being set to set position and coupled to said actuating means for disengaging said adjustment means from said setting means and for operating said actuating means for time periods longer than the limits, and operating means in said housing coupled to and enabling said control means to function.

8. A system as in claim 7, wherein said control means includes second setting means independent of said first setting means.

9. A system as in claim 8, wherein said control means includes shutter release means, circuit means coupled to and responsive to said shutter release means, timing means coupled to and responsive to said setting means and said circuit means and said shutter release means for operating said actuating means for the time set by said second setting means.

10. A system as in claim 7, further comprising viewer means in said housing for viewing the subject to be photographed, first photoelectric indicating means in said body responsive to subjects in one range of brightness and second photoelectric indicating means in said housing responsive to subjects in a second range of brightness, and optical means in said body and said housing responsive to the functioning of said control means for displaying the response of said second indicating means when said adjustment means are disengaged from said setting means and for displaying the response of said first indicating means when said adjustment means are engaged with said setting means.

11. For a single lens reflex camera having a shutter time setting member and a shutter release member; a low illumination shutter control system, comprising an adapter housing mounted on the camera and having a finder optical system, first mechanical coupling means mounted on said housing for engaging the shutter time setting member when an exposure time is less than a given value and releasing the shutter time setting member when the time exceeds a given value, second mechanical coupling means mounted on the housing and being engageable with the shutter release member, shutter operating means mounted on the housing and coupled to said second coupling means for causing said second coupling means to actuate said shutter release member, long time timing means in the adaptor housing, said long time timing means including a variable time constant circuit having a capacitor and a resistor, an attachment shutter time setting member coupled to the time constant circuit for varying the time constant thereof and coupled to said first coupling means for housing said first coupling means to turn the shutter time setting member, a switching circuit responsive to the amount of charge applied across the capacitor by the resistor, electromagnetic means responsive to said switching circuit and coupled to said second coupling means for deactivating said shutter release member after a given time, and second switching means responsive to said second coupling means operating the shutter release means for enabling the time constant circuit to function.

12. A system as in claim 11, wherein the resistor in said time constant circuit is a variable resistor; said timing means including a photoelectric element mounted in the adaptor housing in the light path of the finder, a meter coupled to the photoelectric element and having a pointer which varies in response to the output of the photoelectric element, a photometric circuit including the photoelectric element in the meter and a second variable resistor, said second variable resistor being varied with the first variable resistor in said time constant circuit.

13. A system as in claim 12, wherein said timing means further comprises means associated with the meter pointer for projecting an image of the meter pointer.

14. A system as in claim 13, wherein the optical system includes shielding means to eliminate stray light impinging upon the photoelectric element.

15. A system as in claim 11, wherein said timing means further comprises a switch coupled to said second coupling means and operable when said second coupling means actuates said shutter release member, and illumination means energized upon the operation of said switch, said illumination means having an oscillation circuit and a lamp coupled to said oscillation circuit and being turned on and off by the output of said oscillation circuit.

16. An exposure control system for the shutter of a camera comprising actuating means for the shutter, setting means connected to the shutter and said actuating means for setting shutter times between predetermined shutter time limits and for causing said shutter to operate at the set shutter times, said setting means also being settable to a position where said shutter will open and close directly in response to said actuating means, a camera body, said actuating means and said setting means being mounted in the body, an adapter housing, adjustment means in said adapter housing engageable and disengageable from said setting means for adjusting said setting means, clutch means connected between the adjustment means and the setting means, control means comprising a timing circuit means adapted to be associated with said adjustment means so as to be electrically connected with said timing means, and coupled to said actuating means, the control means being operative in response to said setting means being set to said position for disengaging said adjusting means from the setting means through said clutch means and for operating said actuating means for time periods longer than that set by the setting means.

17. An exposure control system for a photographic camera comprising:
a shutter means for exposing a photosensitive member over varying durations,
a first timing device for establishing a long time range of shutter durations, said timing device including a first manipulating means for adjusting the shutter duration within the long time range and a first control means connected with the first manipulating means for defining the shutter opening and closing duration, and connected operatively to the shutter means, the control means comprising an electronic time delay circuit means having an adjustable RC time constant circuit coupled operatively with the first manipulating means, so as to adjust the time constant,
a second timing device for establishing a shorter time range of shutter durations, the second timing device including a second manipulating means for adjusting the shutter duration within the shorter time range, the second manipulating means being arranged rotationally on an axis of the first manipulating means, and a second control means connected with the second manipulating means for defining the shutter durations and connected operatively to the shutter means,
and clutch means positioned between the second manipulating means and the first control means for disconnecting the first control means with the second manipulating means when the second manipulating means is adjusted to a bulb exposure position.

18. The exposure system according to claim 17, wherein the first control means includes switching means associated with the second timing device and connected to control means so as to adapt the control means to the long time range of the shutter duration.

19. The exposure system according to claim 17, wherein the second control means includes holding means associated with the electromagnetic means, the holding means being controllable by the first manipulating means to sustain mechanically the electromagnetic means in an ineffective state when the second manipulating means is adjusted in to the shorter time range mode.

20. An exposure control system for a photographic camera comprising:
shutter means built in the housing for exposing a photosensitive member, control means for controlling the shutter opening and closing duration operatively connected to the shutter means, adjusting means for adjusting the shutter duration, connected operatively to the control means, the adjusting means comprising a first time setting member rotatably arranged for causing the control means so as to establish a long time range of the shutter duration and a second time setting member movably mounted at the rotational axis of the first setting member for adjusting the shutter means so as to establish a shorter time range thereof and a bulb exposure, clutch means position between the first setting member and second setting member for disconnecting the second setting member with the control means when the second setting means is adjusted to the bulb exposure, the control means having an electronic timing circuit with its timing duration adjustable by the first setting member and an electromagnetic means connected electrically to the timing circuit and adapted to be associated with the shutter means so as to define the shutter duration thereby, the shutter means being selectively adjustable by one of the first and second time setting member over a wide shutter duration range.

21. A single reflex camera comprising:

a camera housing, shutter means built in the housing for exposing a photosensitive member, first control means for controlling the shutter opening and closing duration operatively connected to the shutter means, first manipulating means connected to the first control means for adjusting the shutter duration, an adaptor housing removably mounted on said housing, optical means forming a part of a view finder having a pentaprism and an eye piece, the optical means being built in the adaptor housing, exposure meter means having an indicating meter built in the adaptor housing, second manipulating means rotatably mounted on the adaptor housing, the manipulating means having a shutter time setting dial and an engaging member connected with the dial, clutch means positioned between the engaging member of the second manipulating means and the first control means, which is declutchably arranged when the first manipulating means is operated effectively, whereby the shutter means is adjusted by the first and second manipulating means selectively over a wide shutter range.

22. A single lens reflex camera comprising:

a camera housing, shutter means built in the housing for exposing a photosensitive member, a first control means for controlling the shutter opening and closng duration, the means being operatively connected to the shutter means, so as to establish a first time setting range and a bulb exposure, a first manipulating means mounted on the housing and connected to the first control means, having a rotatable shutter speed setting dial, a second manipulating means mountable on the housing for defining a longer time range than the first range of the shutter means, a second control means for controlling the shutter opening and closing duration, the means being operatively connected to the shutter means, an adaptor housing removably mounted on the camera housing, exposure metering means having an indicating means built in the adaptor housing, optical means forming a part of view finder having a pentaprism and an eye piece, the optical means being built in the adaptor housing, clutch means positioned between the first manipulating means and second manipulating means, the both means being connected through the clutch means in setting the shorter time-range shutter speed, clutch release means connected with the clutch means for declutching the first manipulating means with the second manipulating means, transmitting means connected to the second manipulating means and with the exposure metering means so as to insert the setting of the shutter time information into the exposure meter means, so that the indicating means indicates whether proper exposure is given at the defining shutter time by the second manipulating means when the release means is actuated.

* * * * *

UNITED STATES PATENT OFFICE
CERTIFICATE OF CORRECTION

Patent No. 3,964,075                    Dated    June 15, 1976

Inventor(s) SYOHEI OHTAKI et al

It is certified that error appears in the above-identified patent and that said Letters Patent are hereby corrected as shown below:

> Column 12, line 42, "exposure meter means" should read --exposure metering means--.

Signed and Sealed this

Fourteenth Day of December 1976

[SEAL]

*Attest:*

RUTH C. MASON
*Attesting Officer*

C. MARSHALL DANN
*Commissioner of Patents and Trademarks*